United States Patent
Zhou (10) Patent No.: US 11,429,588 B2
(45) Date of Patent: Aug. 30, 2022

(54) METHODS AND SYSTEMS FOR PROCESSING LOG DATA

(71) Applicant: ZHEJIANG DAHUA TECHNOLOGY CO., LTD., Zhejiang (CN)

(72) Inventor: Mingwei Zhou, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 356 days.

(21) Appl. No.: 16/433,150

(22) Filed: Jun. 6, 2019

(65) Prior Publication Data
US 2019/0286628 A1     Sep. 19, 2019

Related U.S. Application Data

(63) Continuation of application No. PCT/CN2016/109000, filed on Dec. 8, 2016.

(51) Int. Cl.
*G06F 16/23*     (2019.01)
*G06F 11/07*     (2006.01)
*G06F 11/34*     (2006.01)

(52) U.S. Cl.
CPC ...... *G06F 16/2365* (2019.01); *G06F 11/0709* (2013.01); *G06F 11/079* (2013.01); *G06F 11/0751* (2013.01); *G06F 11/0754* (2013.01); *G06F 11/0781* (2013.01); *G06F 11/0787* (2013.01); *G06F 11/3476* (2013.01)

(58) Field of Classification Search
CPC ............... G06F 11/079; G06F 11/0751; G06F 11/0709; G06F 11/0787; G06F 16/2365; G06F 11/0754; G06F 11/0781; G06F 11/3476
See application file for complete search history.

(56) References Cited

U.S. PATENT DOCUMENTS

| | | | |
|---|---|---|---|
| 7,475,401 B1 | 1/2009 | Frey et al. | |
| 8,468,391 B2 | 6/2013 | Balani et al. | |
| 9,411,672 B1 | 8/2016 | Cooper et al. | |
| 2006/0037076 A1* | 2/2006 | Roy | G06F 16/3329 726/22 |

(Continued)

FOREIGN PATENT DOCUMENTS

| | | |
|---|---|---|
| CN | 105159964 A | 12/2015 |
| WO | 2012121901 A1 | 9/2012 |

OTHER PUBLICATIONS

Communication Pursuant to Article 94(3) EPC in European Application No. 16923269.1 dated Aug. 3, 2020, 8 pages.

(Continued)

*Primary Examiner* — Jigar P Patel
(74) *Attorney, Agent, or Firm* — Metis IP LLC (57) ABSTRACT

A method for processing log data in a server system is disclosed. The method includes: extracting level information associated with the log data, wherein the level information comprises at least one log level indicative of severity of a log event; filtering the log data based at least in part on the level information to generate filtered log data; and correcting, using a processor, the level information in response to determining that the level information of the filtered log data does not match the log event.

17 Claims, 6 Drawing Sheets

(56) References Cited

U.S. PATENT DOCUMENTS

| | | | |
|---|---|---|---|
| 2008/0198422 A1* | 8/2008 | Casey | H04L 41/0686 |
| | | | 358/425 |
| 2010/0223499 A1* | 9/2010 | Panigrahy | G06F 11/079 |
| | | | 714/19 |
| 2013/0031086 A1* | 1/2013 | Strelec | G06F 16/2465 |
| | | | 707/722 |
| 2013/0086429 A1 | 4/2013 | Ng | |
| 2014/0162219 A1* | 6/2014 | Stankoulov | B60W 50/14 |
| | | | 434/65 |
| 2014/0188783 A1 | 7/2014 | Agarwal et al. | |
| 2014/0373018 A1 | 12/2014 | Liu et al. | |
| 2015/0089270 A1 | 3/2015 | Jeong et al. | |
| 2015/0127979 A1 | 5/2015 | Doppalapudi | |
| 2015/0143182 A1* | 5/2015 | Rajamanickam | G06F 11/3072 |
| | | | 714/48 |
| 2016/0330219 A1* | 11/2016 | Hasan | H04L 63/20 |

OTHER PUBLICATIONS

International Search Report in PCT/CN2016/109000 dated Aug. 29, 2017, 4 pages.
Written Opinion in PCT/CN2016/109000 dated Aug. 29, 2017, 3 pages.
The Extended European Search Report in European Application No. 16923269.1 dated Nov. 19, 2019, 9 pages.

\* cited by examiner

METHODS AND SYSTEMS FOR PROCESSING LOG DATA

CROSS-REFERENCE TO RELATED APPLICATIONS

This application is a Continuation of International Application No. PCT/CN2016/109000, filed on Dec. 8, 2016, the contents of which is incorporated herein by reference in its entirety.

TECHNICAL FIELD

The present disclosure generally relates to a server system and method. More particularly the present disclosure relates to methods and systems for processing log data in a server system.

BACKGROUND

Server systems, such as application servers and web servers, are widely used for providing services in various environments. While a server system is working, an application provided by the server system may fail. Log data (e.g., an error message) may be generated and used to debug such failure. However, debugging the application failure using the log data may involve manually processing a huge amount of log data by engineers or other personnel. It is desirable to provide a system and method for processing the log data automatically.

SUMMARY

In some embodiments, a system for processing log data is disclosed. The system may include a communication port, a memory and a processor operatively coupled to the communication port and the memory. The processor may be configured or used to extract information associated with the log data; filter the log data based on at least in part on the level information to generated filtered log data; and correct the level information in response to determining that the level information of the filtered log files does not match the log events.

In some embodiments, the level information can include at least one log level indicative of severity of a log event.

In some embodiments, the processor may further determine a threshold level; compare the level information with the threshold level information; and filter the log data based on the comparison.

In some embodiments, to filter the log data based on the comparison, the processor may further generate the filtered log data in response to determining that the log level is higher than the threshold level.

In some embodiments, the processor may correct the level information of filtered log data based on severity of the log event.

In some embodiments, the processor may handle the log event in response to determining that the level information of the filtered log files matches the log event.

In some embodiments, the processor may further analyze information related to the log event; generate an inferred solution based on the analysis; and solve an error related to the log event using the inferred solution.

In some embodiments, the information related to the log event may include at least one of user context, timing information, and a description of the log event.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, module, systems, devices, and/or drivers have been described at a relatively high-level, without detail, in order to avoid unnecessarily obscuring aspects of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "module," and/or "unit" used herein are one method to distinguish different components, elements, parts, section or assembly of different level in ascending order. However, the terms may be displaced by other expression if they may achieve the same purpose.

It will be understood that when a device, unit, or module is referred to as being "on," "connected to," or "coupled to" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The present disclosure provides a server system which may include a log server. In some embodiments, the log server and/or one or more portions of the log server may be integrated within the server system. In some embodiments, the log server and/or one or more portions of the log server may be implemented as stand-alone devices or servers.

The log server may configured to receive and analyze log data when one or more portions of the server system having one or more errors occur. In some embodiments, one or more portions of the server system may collect log data and transmit the collected log data to the log server, which may be stored in the storage medium of the log server for further process. In some embodiments, at least one portion of log data may be analyzed for error correction and/or resolution.

The log server may be configured to correct level information contained in the log data if the level information does not match a corresponding log event. In some embodiments, the log server may be configured to generate an inferred solution for solving the errors occurred in one or more portions of the server system.

The following description is provided to help better understanding a correcting server method or system. The term "server" used in this disclosure may refer to a computable device and/or an application environment. This is not intended to limit the scope the present disclosure. For persons having ordinary skills in the art, a certain amount of variations, changes and/or modifications may be deducted under guidance of the present disclosure. Those variations, changes and/or modifications do not depart from the scope of the present disclosure.

Figure 1:
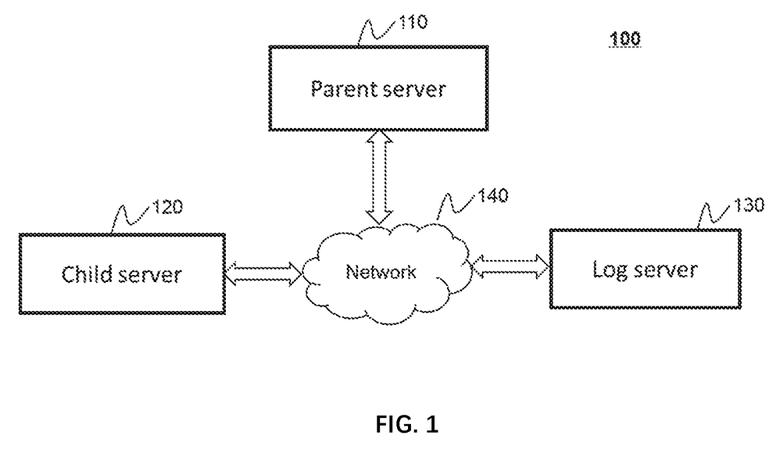
FIG. 1 is a block diagram illustrating an exemplary server system according to some embodiments of the present disclosure.

FIG. 1 is a block diagram illustrating an exemplary cluster server system 100 according to some embodiments of the present disclosure. As illustrated in FIG. 1, cluster server system 100 may include a parent server 110, child server 120, a log server 130, a network 140, and/or any other suitable component for transmitting, receiving, processing, storing, etc. data for a cluster server system. In some embodiments, cluster server system may include one or more child server, for example, lager than two. In some embodiments, the cluster server system may be used in an application environment, a server system, a distribution server system, a monitoring system, a transportation management, a communication system, or the like, or any combination thereof.

For better understanding the present disclosure, a server system may be described as an example of cluster server system 100. It should be noted that cluster server system 100 described below is merely provided for illustration purposes and not intended to limit the scope of the present disclosure.

Parent server 110 may be configured to provide service for the cluster server system. In some embodiments, parent server 110 may include a monitoring module configured to monitor the status of child server 120. In some embodiments, parent server 110 may include a coordinating module configured to coordinate work with child server 120. In some embodiments, parent server 110 may include a controller configured to check and control access request of the child server. In some embodiments, parent server 110 may include a backup server configured to work and take over all tasks when the parent server 110 fails to work. The backup server may be communicatively coupled to parent server 110 and/or integrated with the parent server 110.

In some embodiments, parent server 110 may receive information from child server 120. The information may include an access request, a connection report, an instruction, a status report, an operation report, or the like, or any combination thereof. In some embodiments, parent server 110 may control and coordinate work with child server 120 based on the received information.

In some embodiments, parent server 110 may communicate signals, instruction and/or information with child server 120 and log server 130 via network 140. In some embodiments, parent server 110 may include one or more storage devices configured to store data and/or instructions.

Child server 120 may be configured to process tasks arranged by parent server 110. In some embodiments, child server 120 may be part of a radar system, a sonar system, a computing device (e.g., a mobile phone, a tablet computer, a laptop, a desktop, etc.), a wearable device (e.g., a smart band, a smart watch, eye glasses, a helmets, a goggle, etc.), a robot, another server, or the like, or any combination thereof. In some embodiments, child server 120 may include a receiver configured to receive instructions and/or any other data from parent server 110. For example, the receiver may receive, from parent server 110, a response that is generated in response to an access request to join the cluster server system 100 by child server 120. In some embodiments, child server 120 may include a transmitter configured to transmit information and/or data to parent server 110 and/or any other component of system 100. For example, the transmitter may transmit, to parent server 110, an access request for joining cluster server system 100. As another example, the transmitter may report to parent server 110 during a specific duration (e.g., 2 us or any other time period). Parent server 110 may permit the child server 120 as an available child server after receiving the report. In some embodiments, the receiver and/or the transmitter may be implemented using a transceiver that is configured to transmit data to and/or receive data from parent server 110 and/or any other component of system 100.

In some embodiments, child server 120 may include one or more processors configured to perform tasks assigned by parent server 110. The processor(s) may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof. For example, when parent server 110 have some tasks which should be executed by child server 120, parent server 110 may transmit the tasks to child server 120 and child server 120 may perform tasks.

In some embodiments, child server 120 may communicate with parent server 110 and/or log server 130 via network 140. In some embodiments, child server 120 may include storage configured to store data and/or instructions.

Log server 130 may be configured to store and/or analyze log data. In some embodiments, log server 130 may include a distributed server configured to share information. In some embodiments, log server 130 may include a batch processing file system configured to store log data and process log data when the log data have reached to a predetermined amount. The batch processing file system may collect log data and aggregate log data into a log file.

Network 140 may be configured to facilitate communications among the components of cluster server system 100, such as parent server 110, child server 120, log server 130, and/or any other suitable components for transmitting, receiving, processing, storing, etc. data for a cluster server system. For example, network 140 may transmit information from parent server 110 to child server 120. As another example, network 140 may transmit data processed and/or generated by parent server 110 to log server 130.

In some embodiments, network 140 may include a wired network, a wireless network, or any connection capable of transmitting and receiving data. In some embodiments, the wired network may include a connection using a metal cable, an optical cable, a hybrid cable, or the like, or any combination thereof. In some embodiments, the wireless network may include a near field communication (NFC), a body area network (BAN), a personal area network (PAN, e.g., a Bluetooth, a Z-Wave, a ZigBee, a wireless USB), a near-me area network (NAN), a local wireless network, a backbone, a metropolitan area network (MAN), a wide area network (WAN), an internet area network (IAN, or cloud), or the like, or any combination thereof. In some embodiments, parent server 110, child server 120, log server 130, or network 140 may be connected to or communicate with each other directly or indirectly.

In some embodiments, two or more components of parent server 110, child server 120 and log server 130 may be integrated with each other. For example, parent server 110 and log server 130 may be integrated as a one device. As another example, child server 120 and log server 130 may be integrated as a one device. In some embodiments, one or more of the above components may be located remote from each other. Merely be way of example, log server 130 may be implemented as a single device to store, process, and/or analyze data on a cloud platform (e.g., a cloud storing platform or cloud computing platform). As another example, child server 120 may be controlled by a remote system (e.g., a remote security system).

It should be understood that, the component of cluster server system 100 illustrated in FIG. 1 may be implemented via various ways. For example, the components may be implemented through hardware, software, or a combination thereof. Herein, the hardware may be implemented by a dedicated logic, the software may be stored in a storage device, the system may be executed by proper instructions, for example, by a microprocessor or a dedicated design hardware. Those skilled in the art can understand that, the methods and systems described in this disclosure may be implemented by the executable instructions of a computer and/or by control code in the processor, for example, the code supplied in a carrier medium such as a disk, a CD, a DVD-ROM, in a programmable storage such as a read-only memory, or in a data carrier such as optical signal carrier or electric signal carrier. The systems and the methods in the present application may be implemented by a hardware circuit in a programmable hardware device in a ultra large scale integrated circuit, a gate array chip, a semiconductor such as a transistor, a field programmable gate array, a programmable logic device, a software performed by various processors, or a combination thereof (e.g., firmware).

It should be noted that the above description of cluster server system 100 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, log server 130 may be integrated in parent server 110. As another example, the cluster server system 100 may include more child server 120.

Figure 2:
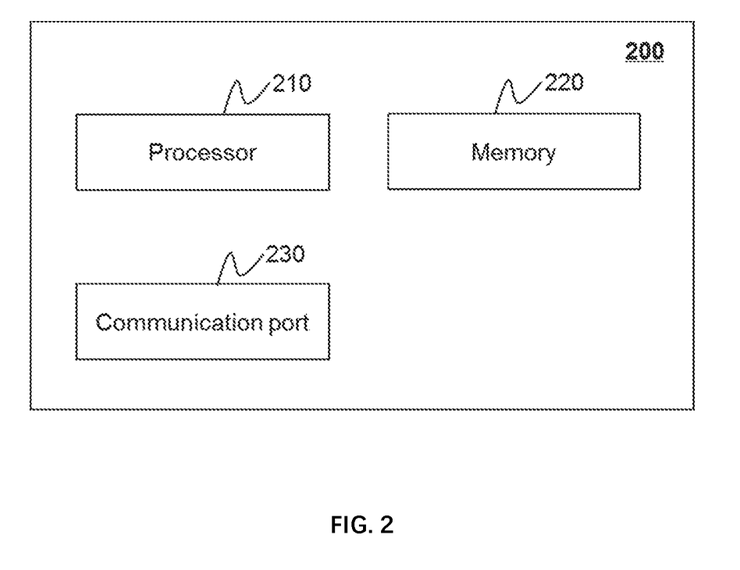
FIG. 2 is a schematic diagram illustrating exemplary hardware and software components of a server according to some embodiments of the present disclosure.

FIG. 2 is a schematic diagram illustrating exemplary hardware and/or software components of a server 200 according to some embodiments of the present disclosure. In some embodiments, each of parent server 110, child server 120, and log server 130 of FIG. 1 may include one or more servers 200 and/or one or more portions of server 200.

As illustrated, server 200 may include a processor 210, a memory 220, and a communication port 230.

Processor 210 may execute computer instructions (program code) and perform functions in accordance with techniques described herein. Computer instructions may include routines, programs, objects, components, data structures, procedures, modules, and functions, which perform particular functions described herein. For example, processor 210 in log server 130 may process log files received from parent server 110, child server 120, and/or any other suitable component of cluster server system 100. In some embodiments, processor 210 may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof. For example, processor 210 in log server 130 may include a microcontroller to process log files from parent server 110 for analyzing and correcting.

Memory 220 may be configured to store data, instructions, program code, application, log files, analyzed results from the parent server 110, child server 120, log server 130 and/or any other component of cluster server system 100. In some embodiments, memory 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, memory 220 may be configured to store one or more programs and/or instructions to perform exemplary methods described in the present disclosure. For example, memory 220 may store a program for log server 130 in order to analyze and correct log files.

Communication port 230 may be configured to communicate with parent server 110, child server 120, and/or log server 130 via network 140. In some embodiments, communication port 304 may include a wired port (e.g., a Universal Serial Bus (USB) port, a High Definition Multimedia Interface (HDMI) port, or the like) or a wireless port (a Bluetooth port, an infrared interface, a WiFi port, or the like).

Figure 3:
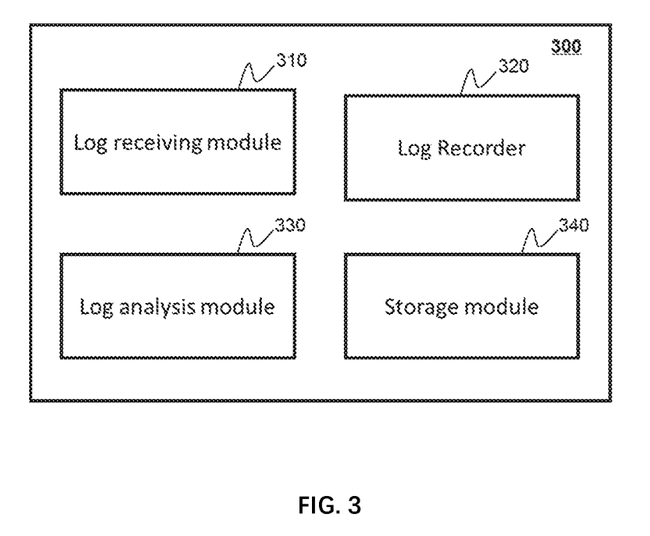
FIG. 3 is a block diagram illustrating an exemplary log server according to some embodiments of the present disclosure.

FIG. 3 is a block diagram illustrating an exemplary log server according to some embodiments of the present disclosure. In some embodiments, log server 130 may include a log receiving module 310, a log recorder 320, a log analysis module 330, a storage module 340, and/or any other suitable component for processing log data according to various embodiments of the present disclosure.

Log receiving module 310 may be configured to receive log data and/or any other data. Log receiving module 310 may be implemented by one or more processors (e.g., processor 210), communication port 230, and/or any other suitable device. In some embodiments, the log data may be transmitted from parent server 110 and/or child server 120, to log server 130. In some embodiments, the log data may include information about one or more operation events associated with one or more servers (e.g., one or more of parent server 110, child server 120, and/or log server 130) and/or any other component of a server system. For example, the log data may include information about an error occurs on one or more of parent server 110, child server 120 and/or log server 130, such as an application failure, a server failure, a hardware failure, or any other event that may be considered as an error. More particularly, for example, if one or more servers (e.g., parent server 110, child server 120 and/or log server 130) start or shutdown abnormally, the servers may generate log data containing the abnormal errors. In some embodiments, an operation event may correspond to an event occurred on parent server 110, child server 120 and/or log server 130 within runtime of the cluster server system 100.

In some embodiments, the log data may include, for example, description of a log event, level information related to the log event, user context related to the log event, timing information of the log event, and/or any other information about the log event. In some embodiments, a log event may be and/or include one or more operation events described above. The description of a log event may include an identifier of the log event (e.g., a log ID), a description of one or more operation events associated with the log event, etc. In some embodiments, level information of a log event may indicate importance of the log event. For example, the level information may include one or more log levels indicative of severity of the log event and/or corresponding operations to be performed in response to detecting such a log event. Multiple log levels may correspond to various levels of severity of log events. The log levels may be ranked by severity. A first log level may be considered as being higher than a second log level when severity associated with the first log level (also referred to as the first severity) is higher than severity associated with the second log level (also referred to as the second severity). Each of the log levels may be represented using any suitable value, such as one or more letters, numbers, symbols, characters, etc. More particularly, for example, the level information may include "debug," "info," "warning," "error," "fatal," or the like, or any combination thereof. For example, the "debug" level may indicate that the corresponding log event may be helpful for debugging servers and/or applications. The "info" level may indicate that the corresponding log event may emphasize running process of servers and/or applications. The "warning" level may indicate that the corresponding log event may have potential errors. The "error" level may indicate that the corresponding log event does not affect running of severs and/or application though the corresponding log event has error occurred. The "fatal" level may indicate that the corresponding log event will cause servers and/or application to exit. In some embodiments, the level information may include one or more custom levels which may be set by a user.

In some embodiments, the user context may be a user profile which is associated with one or more users and defined within runtime of the cluster server system. For example, the user profile may include a source address wherein the error occurred, a user ID information, a user role, or the like, or any combination thereof. The source address may be and/or include an international protocol (IP) address, a media access control (MAC) address, a hard disk drive number, a path on hard disk drive number, a device serial number, or the like, or any combination thereof. The user ID information may be a username, computer name, and/or a user account. The user role may indicate a type of a server related to the log event, such as a parent server, a child server, a portion of a parent server and/or child server, etc.

In some embodiments, timing information of a log event may include one or more timestamps related to the log event (e.g., a start time of an occurrence of the log event, an end time of an occurrence of the log event, etc.), a duration of an occurrence of the log event, etc. In some embodiments, the parent server 110, child server 120 log server 130 and/or any components of the cluster server system may generate the time information in response to detecting an occurrence of the log event.

In some embodiments, log receiving module 310 may transmit and/or receive log data and/or any other information to be used to process the log data. The log data may be transmitted to and/or received from log recorder 320, log analysis module 330, and/or storage module 340 (e.g., via communication port 230).

Log recorder 320 may be configured to record the log data. In some embodiments, log recorder 320 can aggregate the log data into one or more log files for storage, processing, and/or transmission. For example, log recorder 320 may aggregate the level information, the user context, the timing information, the description of the log event and/or any other data into one or more files. Each of the log files may have a specific file format and/or a specific data format. The specific data format can be and/or include any format that is suitable for aggregation and/or storage of the log data. For example, the specific data format may include *.log, *,txt, *excel, *txt, *html, or the like, or any combination thereof. In some embodiments, the log file may correspond to one category, such as an application log file, a system log file, a cluster server log file, a resource allocation log file, or the like, or any combination thereof.

In some embodiments, log recorder 320 may communicate with log receiving module 310, log analysis module 330 and storage module 340 via communication port 230. In some embodiments, log recorder 320 may include one or more registers for buffering the log files. In some embodiments, log recorder 320 may be implemented by one or more processors (e.g., processor 210).

Log analysis module 330 may be configured to process the log data and/or log files provided by log receiving module 310, log recorder 320, storage module 340, and/or any other device. For example, log analysis module 330 may perform one or more operations, such as analyzing the log data, determining a level associated with the log event, correcting level information, generating a solution for the log events, or the like, or any combination thereof. In some embodiments, the level information may be corrected based on the results of analyzing the log data by log analysis module 330. In some embodiments, log analysis module 330 may be implemented by one or more processors (e.g., processor 210).

In some embodiments, log analysis module 330 may correct level information if the level information does not match the log event. If the level information does not match the log event, cluster server system 100 may perform an error operation, which may cause cluster server system 100 to exit or break down. For example, if log analysis module 330 receive a log event having a fatal level while the actual level of the log event is warning, the cluster server system 100 may exit or break down in response to the log event. Log analysis module 330 may correct the fatal level to warning level in order to that the level information match the log event. In some embodiments, log analysis module 330 may analyze the relationship between the log event and user context. The relationship between the log event and user context may determine that the log event can be associated with the user context. For example, the relationship between the log event and user context may be analyzed for determining ontology of log event by log analysis module 330.

In some embodiments, log analysis module 330 may generate a solution for log event. The solution of log event may be used for correcting the error message.

In some embodiments, log analysis module 330 may use various algorithms to process log data. For example, log analysis module 330 may use one or more artificial intelligence (AI) algorithms to analyze log data, correct log data (e.g., level information), determine ontology, generate analyzed result, generate solutions for handling log events, and the like. The AI algorithms may include one or more adaptive algorithms, machine learning algorithms, pattern recognition algorithms, logic programming, intelligent judgement, intelligent reasoner, or the like, or any combination thereof. For example, the AI algorithm(s) may be used to generate an analysis model for analyzing the log data. The analysis model may be used to collect run log and historical log data having an error associated with level information. The analysis model may use the collected data to test server environment and simulate different abnormal methods of a server system to improve the calibration of the level information and providing more sufficient solutions to handle error event.

In some embodiments, log analysis module 330 may communicate with log receiving module 310, log recorder 320 and storage module 340 for transmitting and/or receiving log data, log files, solutions for log events, analyzed results, and the like.

Storage module 340 may be configured to store data provided by log receiving module 310, log recorder 320, log analysis module 330 and/or any other component of log server 130. In some embodiments, storage module 340 may be implemented using one or more storage devices (e.g., memory 220).

In some embodiments, storage module 340 may include one or more storage devices, such as a mass storage, a removable storage, a volatile read-and-write memory, a read-only memory (ROM), or the like, or any combination thereof. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, storage module 340 may be configured to store one or more log data, log files, solution for log event, analyzed result, any intermediate information when log server 130 runs, programs, instructions, or the like, or any combination thereof. For example, storage module 340 may store solution for log event based on at least part of the analyzed result from log analysis module 330, in order to correct error indicated by the log event.

It should be noted that the above description of log server 130 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, memory 220 and/or storage module 340 may be optional, and log server 130 may share a memory with parent server 110 or child server 120. As another example, any two or more modules in log server 130 may be integrated as a single device.

Figure 4:
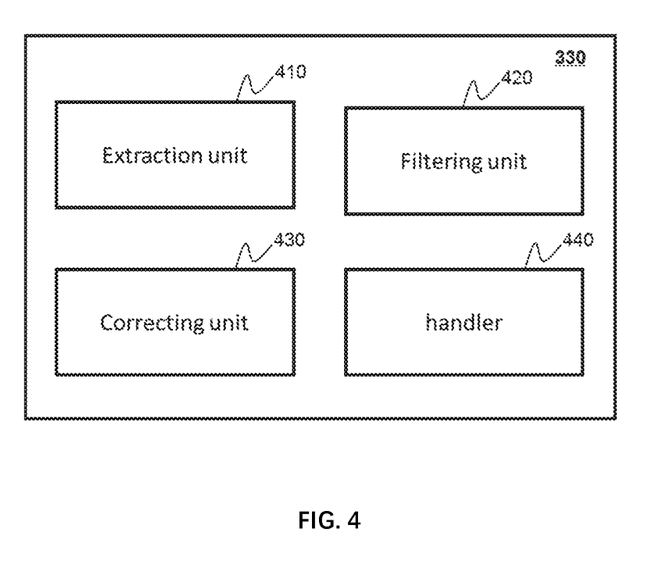
FIG. 4 is a block diagram illustrating an exemplary log analysis module according to some embodiments of the present disclosure.

FIG. 4 is a block diagram illustrating an exemplary log analysis module 330 according to some embodiments of the present disclosure. In some embodiments, log analysis module 330 may include an extraction unit 410, a filtering unit 420, a correcting unit 430, a handler 440, and/or any other components for processing log data.

Extraction unit 410 may be configured to extract information from log data for further processing. In some embodiments, extraction unit 410 may receive log data from log receiving module 310, log recorder 320, storage module 340, and/or any other component of the log server 130. For example, log data can be transmitted to extraction unit 410 directly from log receiving module 310. In some embodiments, extraction unit 410 may transmit the extracted information to filtering unit 420, correcting unit 430, handler 440, and/or any other component of the log analysis module 330.

Filtering unit 420 may be configured to filter log data for analysis. In some embodiments, filtering unit 420 may be configured to determine a threshold level for filtering log data. The threshold level may correspond to a particular log level. For example, the threshold level may be one or more levels indicative of particular severity of log events, such as "debug," "info," "warning," "error," "fatal," etc. The threshold level may be determined by parent server 110, child server 120, log server 130, a user, or the like, or any combination thereof. In some embodiments, filtering unit 420 may receive level information of log data from the extraction unit 410.

In some embodiments, filtering unit 420 can compare level information of log data with the threshold level and can then filter the log data based on the comparison. For example, filtering unit 420 can determine whether a log level associated with particular log data is higher than the threshold level (e.g., by determining whether the severity associated with the log level is higher than the severity associated with the threshold level). Filtering unit 420 can then determine that the particular log data is to be processed in response to determining that the log level is higher than the threshold level. Alternatively, filtering unit 420 can determine that the particular log data is not to be processed in response to determining that the log level is not higher than the threshold level. More particularly, for example, log data associated with an "error" level and "fatal" level may be filtered if the threshold level is "warning" level.

Correcting unit 430 may be configured to correct level information of log data. In some embodiments, correcting unit 430 may receive the filtered log data from the filtering unit 420 and can then process the level information of the filtered log data for correction. For example, correcting unit 430 can determine whether the level information matches the corresponding log event of the log data and can correct the level information based on such determination. In some embodiments, the level information may be determined as matching the corresponding log event when severity associated with the level information matches severity of the log event. More particularly, for example, correcting unit 430 can determine that a log data item includes a log event associated with a "warning" log level can cause servers and/or applications to exit and thus is to be labeled as a "fatal" level. Correcting unit 430 may determine that the level information does not match the corresponding log event and may correct the level information (e.g., by associating the log event with a "fatal" log level).

In some embodiments, correcting unit 430 may utilize AI algorithms to analyze log data, compare log data, correct log data, and the like. The AI algorithms may include adaptive algorithm, machine learning, pattern recognition, logic programming, intelligent judgement, intelligent reasoner, or the like, or any combination thereof. For example, the AI algorithms may use machine learning scheme to collect system operation data and improve correcting ability gradually.

In some embodiments, correcting unit 430 may monitor operation status of one or more units, modules, and/or whole system in the parent server 110, child server 120 and/or log server 130. The correcting unit 430 may also analyze operation data about multiple components (e.g., units, modules, etc.) of a system (e.g., the parent server 110, child server 120, log server 130, system 100, etc.) and then correct level information associated with the components and/or system based on the analysis. For example, the correcting unit 430 can detect discrepancies between level information associated with multiple components and/or systems. In some embodiments, when a log event (e.g., an abnormity, an error, etc.) occurs in a specific module (e.g., log receiving module 310, log recorder 320, log analysis module 330, storage module 340, etc.) of the log server 130, functions of the other components of the log server 130 and/or the log server 130 may not be affected by the log event in a significant manner. For example, when an abnormity occurs in the specific module, the log server 130 may function normally. As such, the particular module and the log server 130 may assign different level information (e.g., different log levels) to the log event. For example, the level data from the specific module may comprise an "error" level and the level data from the other module(s) and/or the log server 130 may comprise other level information (e.g., a log level that is not higher than "error," such as "warning"). In response to detecting the discrepancy between the level information provided by the particular module (e.g., a first log level, such as "error") and the level information provided by the other modules and/or the log server 130 (e.g., a second log level, such as "warning"), the correcting unit 430 can correct such discrepancy. For example, the correcting unit 430 can correct the level information associated with the specific module based on the level information provided by the other modules and/or child server (e.g., by adjusting the "error" level to a warning level). As another example, the correcting unit 430 can correct the level information associated with the other modules and/or the child server based on the level information provided by the specific module (e.g., by adjusting the "warning" level to an "error" level). In some embodiments, data generated by the correcting unit 430 (e.g., corrected level information) can be stored as historical correction data in one or more suitable storage devices. Correcting unit 430 can correct log data based on the historical correction data (using an iterative learning algorithm).

Handler 440 may be configured to handle one or more log events, for example, by detecting one or more errors related to the log event(s), resolving the errors, anticipate the error(s), and/or performing any other handling operation. In some embodiments, handler 440 may be configured to determine an ontology data. The ontology data may express relationships between a log event, a user context, an application, and the like. For example, handler 440 may determine a relevant error event information based on the extracted information provided by extraction unit 410 and create a mapping for relevant error events, the user context and an application. In some embodiments, handler 440 may generate a solution based on the determination.

In some embodiments, handler 440 may transmit the solution to parent server 110, child server 120, log server 130, and/or any other components of the cluster server system 100. In some embodiments, handler 440 may utilize AI algorithms to analyze log event, create ontology, generate solution, and the like. The AI algorithms may include adaptive algorithm, machine learning, pattern recognition, logic programming, intelligent judgement, intelligent reasoner, or the like, or any combination thereof. For example, the machine learning may be used to generate the solution for error events.

It should be noted that the above description of log analysis module 330 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, extraction unit 410 may be optional. As another example, any two or more units in log analysis module 330 may be integrated as a single unit.

Figure 5:
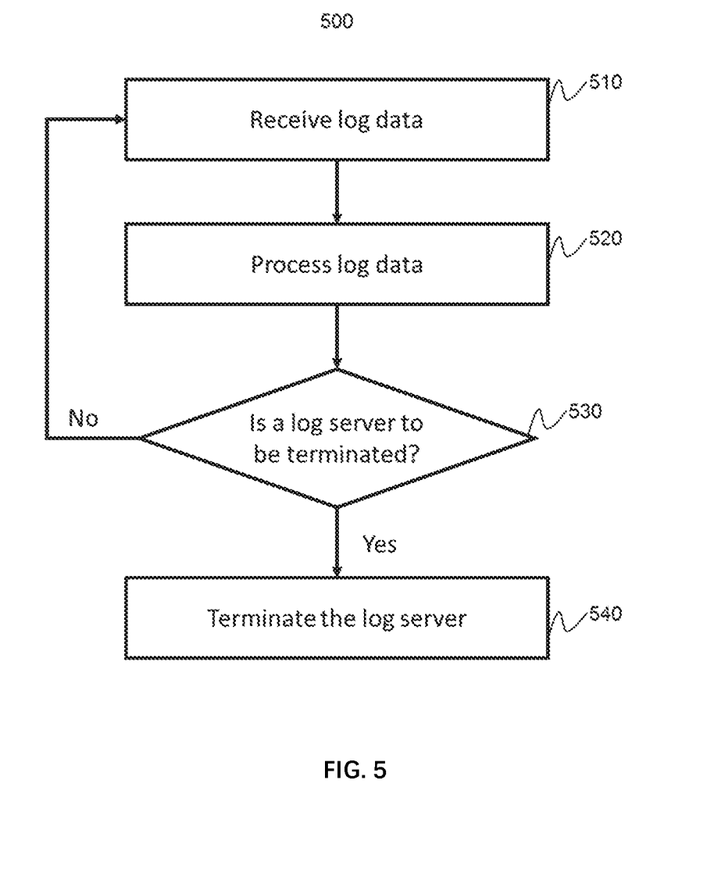
FIG. 5 is a flow chart illustrating an example of a process for correcting log files according to some embodiments of the present disclosure.

FIG. 5 is a flow chart illustrating an example 500 of a process for correcting log files according to some embodiments of the present disclosure. In some embodiments, process 500 may be executed using one or more hardware processors implementing a log server as describe in connection with FIGS. 1-4.

At 510, log receiving module 310 may revive log data from a server, such as parent server 110, child server 120, log server 130, and/or any other components of cluster server system 100. In some embodiments, the log data may include information about one or more operation events associated with one or more servers (e.g., one or more of parent server 110, child server 120, and/or log server 130) and/or any other component of a server system. For example, the log data may include information about an error occurs on one or more of parent server 110, child server 120 and/or log server 130, such as an application failure, a server failure, hardware failure, or any other event that may be considered as an error. More particularly, for example, the log data may include description of a log event, level information related to the log event, user context related to the log event, timing information of the log event, and/or any other information about the log event.

At 520, log analysis module 330 may process the log data. In some embodiments, the log data may be provided by log receiving module 310, log recorder 320, storage module 340, and/or any other device. In some embodiments, log analysis module 330 may analyze the log data, determine a level associated with the log event, correct level information, generate a solution for the log events, or the like, or any combination thereof. For example, correcting level information may be performed by log analysis module 330 if the level information does not match the log event. As another example, a solution for the log event may be generated for correcting the error message.

At 530, processor 210 may determine whether or not log server 130 is to be terminated. For example, processor 210 may determine that log server 130 is to be terminated in response to determining that all log data have been processed. As another example, processor 210 may determine that log server 130 may be terminated if no more log data is to be received by log server 130.

If log server 130 is terminated, the process 500 may advance to 540. Otherwise, the process 500 may advance to 510.

In 540, the processor 210 may terminate the log server.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, 530 and 540 may be combined as a single step in order to make a determination of status of log server 130.

Figure 6:
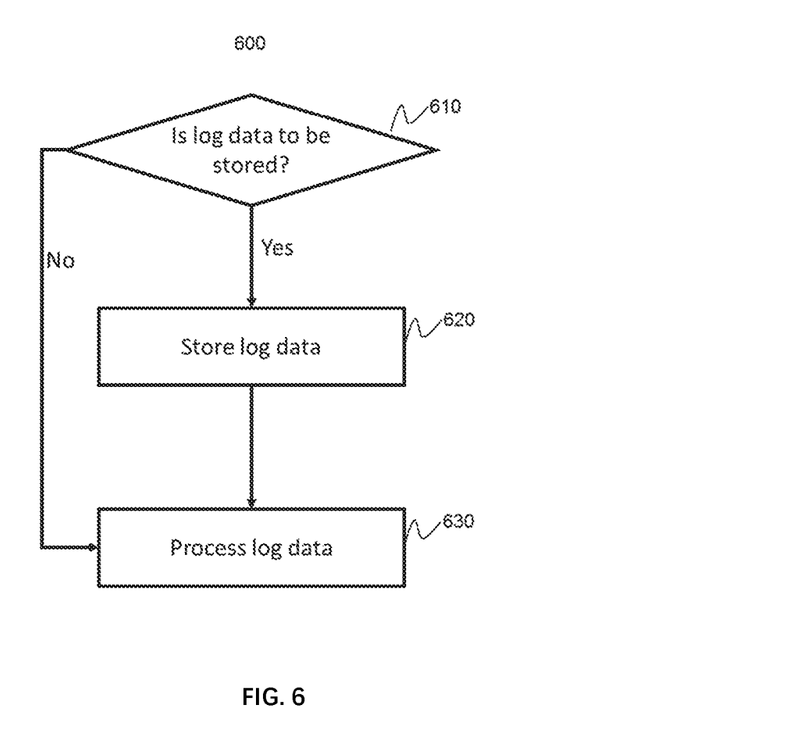
FIG. 6 is a flow chart illustrating an example of a process for receiving log data according some embodiments of the present disclosure.

FIG. 6 is a flow chart illustrating an exemplary example 600 of a process for receiving log data according some embodiments of the present disclosure. In some embodiments, process 600 may be executed using one or more hardware processors implementing a log server as described above in connection with FIGS. 1-4.

At 610, log receiving module 310 may determine whether the log data provided by servers (e.g., parent server 110, child server 120, log server 130) is to be stored. For example, if the log data need to be processed in real time, log receiving module 310 may transmit the log data to log analysis module 330, and then process 600 may advance to 630. Alternatively, if the log data need to be processed later or batch processed, log receiving module 310 may transmit log data to log recorder 320 and/or storage module 340, and then process 600 may advance to 620.

At 620, log recorder 320 and/or storage module 340 may store log data. For example, log recorder 320 may record the log data and aggregate the log data into one or more log file for storage, processing and/or transmission. The log file may include one category, for example, application log file, system log file, cluster server log file, disaster management log file, resource allocation log file, or the like, or any combination thereof. Each of the log files may have a specific file format and/or a specific data format. The specific data format can be and/or include any format that is suitable for aggregation and/or storage of the log data. As another example, storage module 340 may store the log data, and then transmit a number of log data for batch processing.

In 630, log analysis module 330 may process log data. The log data may be provided by log receiving module 310, log recorder 320, storage module 340, and/or any other device. For example, log analysis module 330 may perform one or more operations, such as analyzing the log data, determining a level associated with the log event, correcting level information, generating a solution for the log events, or the like, or any combination thereof. More particularly, log analysis module 330 may correct the level information and generate an inferred solution for the log event based on the results of analyzing the log data.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, 610 and 620 may be combined as a single step for storing the log data received from parent server 110, child server 120 and/or log server 130 via communication port 230.

Figure 7:
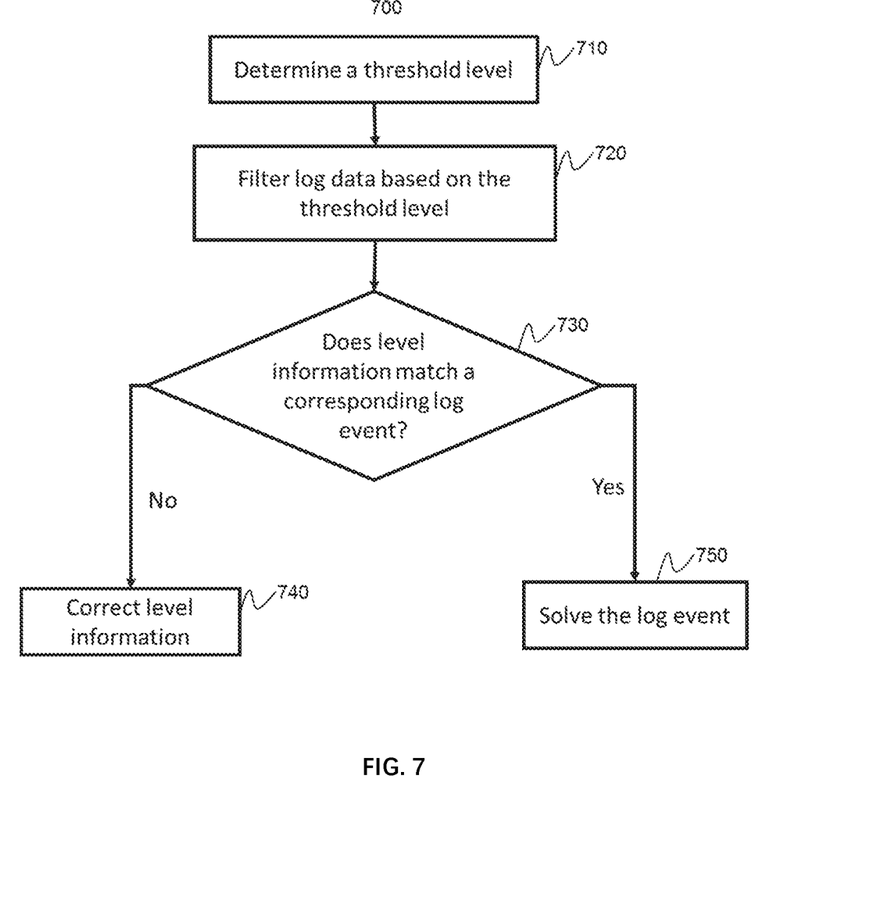
FIG. 7 is a flow chart illustrating an example of a process for correcting log level information according to some embodiments of the present disclosure.

FIG. 7 is a flow chart illustrating an exemplary example of a process 700 for correcting log level information according to some embodiments of the present disclosure. In some embodiments, process 700 may be executed using one or more hardware processors implementing a log server as described above in connection with FIGS. 1-4.

At 710, filtering unit 420 may determine a threshold level. The threshold level may correspond to a particular log level, for example, "debug," "info," "warning," "error," "fatal," etc. In some embodiments, the threshold level may be compared with the level information of log data by filtering unit 420. For example, filtering unit 420 may determine whether a log level associated with particular log data is higher than the threshold level, and then determine that the particular log data may be processed in response to determination that the log level is higher than the threshold level. In some embodiments, the threshold level may be determined by parent server 110, child server 120, log server 130, a user, or the like, or any combination thereof. In some embodiments, the threshold level may be determined by AI algorithms, for example, adaptive algorithm, machine learning, pattern recognition, logic programming, intelligent judgement, intelligent reasoner, etc.

At 720, filtering unit 420 may filter log data and/or log file based on comparison of the level information and threshold level. For example, if a log level is associated with particular log data is higher than the threshold level (e.g., by determining whether the severity associated with the log level is higher than the severity associated with the threshold level), the particular log data may be processed. Alternatively, the particular log data may not be processed in response to the comparison that the log level is not higher than the threshold level. More particularly, log data associated with an "error" level and "fatal" level may be filtered and processed if the threshold level is "warning" level.

At 730, correcting unit 430 may determine whether the level information matches with corresponding log events or not. In some embodiments, the level information may be determined as matching the corresponding log event when severity associated with the level information matches severity of the log event. More particularly, for example, a log data item includes a log event associated with a "warning" log level can cause servers and/or applications to exit, and thus correcting unit 430 can determine that the level information does not match the log data.

In some embodiments, process 700 may advance to 740 in response to determination that the level information does not match the corresponding log events. Alternatively, process 700 may advance to 750 in response to determination that the level information matches the corresponding log events.

In 740, correcting unit 430 may correct the level information of log data. Correcting unit 430 may correct the level information based on the determination that the level information does not match the corresponding log events. For example, if a log event associated with a "warning" level can cause servers and/or applications to exit, level information of the log event may be corrected as a "fatal" level.

In some embodiments, correcting unit 430 may utilize AI algorithms to analyze log data, compare log data, correct log data, and the like. The AI algorithms may include adaptive algorithm, machine learning, pattern recognition, logic programming, intelligent judgement, intelligent reasoner, or the like, or any combination thereof. For example, the AI algorithms may use machine learning algorithm to collect historical correcting data and improve correcting ability gradually.

In 750, handler 440 may solve the log event. More details of solving the log event may be described in the FIG. 8.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, 710 and 720 may be combined as a single step for filtering the log data and/or log files based on the level information contained in the log data and/or log files.

Figure 8:
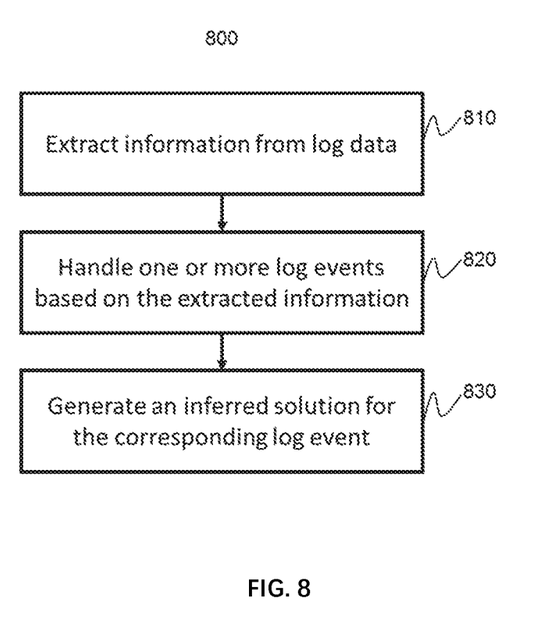
FIG. 8 is a flow chart illustrating an example of process=for generating a solution for log events according to some embodiments of the present disclosure.

FIG. 8 is a flow chart illustrating an exemplary example of process 800 for solving the log events according to some embodiments of the present disclosure. In some embodiments, process 800 may be executed using one or more hardware processors implementing a log server as described above in connection with FIGS. 1-4.

At 810, extraction unit 410 may extract information from log data. In some embodiments, extraction unit 410 may receive log data from log receiving module 310, log recorder 320, storage module 340, and/or any other component of the log server 130. In some embodiments, the extracted information may include a level information, a user context, a timestamp information, a log event, or the like, or any combination thereof.

At 820, handler 440 may handle one or more log events based on the extracted information. For example, handler 440 may detect one or more errors related to the log event(s), resolving the error(s) and anticipate the error(s). More particularly, handler 440 may determine an ontology data, which may express relationships between the log event, the user context, an application and the like. As another example, handler 440 may determine a relevant error event information based on the extracted information and create a mapping for relevant error events, the user context and an application.

In 830, handler 440 may generate an inferred solution for corresponding log events. For example, handler 440 may generate the inferred solution based on the ontology data, which may express relationships between the log event, the user context, an application and the like. As another example, handler 440 may generate the inferred solution based on the relevant error event information and the mapping of relevant error events, the user context and an application.

In some embodiments, handler 440 may utilize AI algorithms to handle the log events. For example, handler 440 may utilize AI algorithm to detect errors related to log events, resolving the errors, anticipate the errors, generate inferred solution for log event, and/or any other handling operation. The AI algorithms may include adaptive algorithm, machine learning, pattern recognition, logic programming, intelligent judgement, intelligent reasoner, or the like, or any combination thereof.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, 810 and 820 may be combined as a single step for handling the log information contained in the log data The above described steps of the processes of FIGS. 5-8 can be executed or performed in any order or sequence not limited to the order and sequence shown and described in the figures. Also, some of the above steps of the processes of FIGS. 5-8 can be executed or performed substantially simultaneously where appropriate or in parallel to reduce latency and processing times.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for processing log data in a server system, comprising:
   extracting level information associated with the log data, wherein the level information comprises at least one log level indicative of severity of a log event;
   filtering the log data based at least in part on the level information to generate filtered log data; and
   correcting, using a processor using an analysis model generated by a first artificial intelligence (AI) algorithm, the level information in response to determining that the level information of the filtered log data does not match the log event, wherein filtering the log data based at least in part on the level information comprises:
   determining, using the processor, a threshold level using a second AI algorithm;

comparing the level information with the threshold level; and filtering the log data based on the comparison.

2. The method of claim 1, wherein filtering the log data based on the comparison further comprises generating the filtered log data in response to determining that the log level is higher than the threshold level.

3. The method of claim 1, wherein correcting the level information of the filtered log data comprises determining severity of the log event.

4. The method of claim 1, further comprises handling the log event using a third AI algorithm in response to determining that the level information of the filtered log files matches the log event.

5. The method of claim 4, wherein handling the log event further comprises:

analyzing information related to the log event;

generating an inferred solution based on the analysis; and solving an error related to the log event using the inferred solution.

6. The method of claim 5, wherein the information related to the log event comprises at least one of user context, timing information, or a description of the log event.

7. A system for processing log data, comprising:

a memory for storing log data;

a processor, operatively coupled to the memory, to:

extract level information associated with the log data, wherein the level information comprises at least one log level indicative of severity of a log event;

filter the log data based on at least in part on the level information to generate filtered log data; and correct, using an analysis model generated by a first artificial intelligence (AI) algorithm, the level information in response to determining that the level information of the filtered log files does not match the log events, wherein the processor is further to:

determine a threshold level using a second AI algorithm;

compare the level information with the threshold level information; and filter the log data based on the comparison.

8. The system of claim 7, wherein, to filter the log data based on the comparison, the processor is further to generate the filtered log data in response to determining that the log level is higher than the threshold level.

9. The system of claim 7, wherein the processor is further to handle the log event using a third AI algorithm in response to determining that the level information of the filtered log files matches the log event.

10. The system of claim 9, wherein the processor is further to:

analyze information related to the log event;

generate an inferred solution based on the analysis; and solve an error related to the log event using the inferred solution.

11. The system of claim 10, wherein the information related to the log event comprises at least one of user context, timing information, or a description of the log event.

12. A non-transitory machine-readable storage medium including instructions that, when accessed by a processor, cause the processor to:

extract level information associated with the log data, wherein the level information comprises at least one log level indicative of severity of a log event;

filter the log data based on at least in part on the level information to generate filtered log data; and correct, using an analysis model generated by a first artificial intelligence (AI) algorithm, the level information in response to determining that the level information of the filtered log files does not match the log events, wherein the processor is further to:

determine a threshold level using a second AI algorithm;

compare the level information with the threshold level information; and filter the log data based on the comparison.

13. The non-transitory machine-readable storage medium of claim 12, wherein, to filter the log data based on the comparison, the processor is further to generate the filtered log data in response to determining that the log level is higher than the threshold level.

14. The non-transitory machine-readable storage medium of claim 12, wherein the processor is further to determine severity of the log event.

15. The non-transitory machine-readable storage medium of claim 12, wherein the processor is further to handle the log event using a third AI algorithm in response to determining that the level information of the filtered log files matches the log event.

16. The non-transitory machine-readable storage medium of claim 15, wherein the processor is further to:

analyze information related to the log event;

generate an inferred solution based on the analysis; and solving an error related to the log event using the inferred solution.

17. The non-transitory machine-readable storage medium of claim 16, wherein the information related to the log event comprises at least one of user context, timing information, or a description of the log event.

* * * * *